(12) United States Patent
Nakano

(10) Patent No.: US 6,223,591 B1
(45) Date of Patent: May 1, 2001

(54) PROBE NEEDLE ARRANGEMENT AND MOVEMENT METHOD FOR USE IN AN ATOMIC FORCE MICROSCOPE

(75) Inventor: Katsushi Nakano, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/200,437

(22) Filed: Nov. 27, 1998

(30) Foreign Application Priority Data

Nov. 28, 1997 (JP) .................................................. 9-344143
Dec. 15, 1997 (JP) .................................................. 9-363129

(51) Int. Cl.⁷ ................................ G01B 5/28; G01B 7/34
(52) U.S. Cl. ............................ 73/105; 250/306; 250/307
(58) Field of Search ............................ 73/105; 250/306, 250/307

(56) References Cited

U.S. PATENT DOCUMENTS

| | | | |
|---|---|---|---|
| 5,186,041 | * 2/1993 | Nyyssonen | 73/105 |
| 5,239,863 | 8/1993 | Kado et al. | |
| 5,242,541 | 9/1993 | Bayer et al. | |
| 5,283,442 | 2/1994 | Martin et al. | 250/561 |
| 5,298,975 | * 3/1994 | Khoury et al. | 73/105 X |
| 5,347,854 | * 9/1994 | Martin et al. | 73/105 |
| 5,382,795 | 1/1995 | Bayer et al. | |
| 5,641,896 | * 6/1997 | Karrai | 73/105 |
| 5,990,477 | * 11/1999 | Tomita | 250/306 |

OTHER PUBLICATIONS

Karrai et al., "Piezoelectric Tip–Sample Distance Control for Near Field Optical Microscopes", Appl. Phys. Lett., vol. 66, No. 14, Apr. 3, 1995, pp. 1842–1844.*

Yves Martin et al., "Method for imaging sidewalls by atomic force microscopy" Appl. Phys. Lett. 64 (19), May 9, 1994, pp. 2498–2500.

* cited by examiner

Primary Examiner—Daniel S. Larkin
(74) Attorney, Agent, or Firm—Morgan, Lewis & Bockius LLP (57) ABSTRACT

A probe microscope including a probe needle arrangement having a probe needle part, and a detection part connected to, and formed along the same axis as, the probe needle part; a displacement detector that detects changes in a condition of the probe needle part; and a movement device that drives the probe needle arrangement relative to a sample surface to be measured.

16 Claims, 11 Drawing Sheets

| PHASE | ANGLE SERVO | DAMPING |
|---|---|---|
| IV | ↷ | ↶ |
| III | ↶ | ↷ |
| II | ↶ | ↷ |
| I | | ↶ |

FIG. 11B

PROBE NEEDLE ARRANGEMENT AND MOVEMENT METHOD FOR USE IN AN ATOMIC FORCE MICROSCOPE

This application claims the benefit of Japanese patent application No. 09-344143, filed Nov. 28, 1997 and Japanese patent application No. 09-363129, filed Dec. 15, 1997, both of which are hereby incorporated by reference.

BACKGROUND OF THE INVENTION

1. Field of the Invention

The present invention relates to atomic force microscopes, and more particularly, to a probe needle of a probe microscope, as well as the probe microscope that utilizes the probe needle.

2. Discussion of the Related Art

The probe needle arrangement of an atomic force microscope, such as a probe microscope, is constructed from a cantilever and a probe needle part which extends from the tip end of the cantilever in a direction substantially perpendicular to the direction of length of the cantilever. An atomic force microscope detects changes in the flexing (bending amount) of the cantilever caused by an interaction force between the probe needle part and a sample surface to be detected. Changes in the flexing of the cantilever are generally detected by an optical lever method. In the optical lever method, a light beam is projected onto the cantilever surface, and the flexing of the cantilever is detected by detecting changes in the direction of reflection. The surface shape of the sample can thus be detected with a high resolution by detecting changes in the flexing of the cantilever in this manner.

In industrial fields in which probe microscopes are widely used, and especially in the semiconductor field, there is an increasing need for the control of trenches and detecting of the surface shape of these trenches formed in samples. The objects of control in such cases are the shapes of the side surfaces of the trenches and the shape of the bottoms of the trenches. Such trenches have a narrow width and a high aspect ratio.

Accordingly, a boot type probe needle in which the tip end is flared has been proposed (An example is disclosed in, Yves Martin and H. Kumar Wickramasinghe, Appl. Phys. Lett. 64 (19), May 9, 1994, pp. 2498–2500, "Method for imaging sidewalls by atomic force microscopy"). In this device, the boot type probe needle is caused to undergo minute vibrations in the longitudinal and lateral directions, and the forces acting on the probe needle from the respective directions are measured. Feedback quantities corresponding to the forces acting on the probe respectively. In this way, samples having steep surface profiles are traced by the probe needle. However, in the case of a probe needle part which has edges pointing in the lateral directions, as in the boot type short needle, it is difficult to reduce the diameter of the tip end. As a result, it is difficult to insert the probe needle into the sample's trenches. Furthermore, since the probe needle part is caused to perform a reciprocating motion in the lateral direction perpendicular to the direction of length of the probe needle part in order to detect the force, there is a limit to the width of the trenches that can be measured.

SUMMARY OF THE INVENTION

Accordingly, the present invention is directed to a probe needle of a probe microscope that substantially obviates one or more of the problems due to the limitations and disadvantages of the related art.

One object of the present invention is to provide a probe microscope having a probe needle which can be inserted into trenches having a smaller width and like structure.

Another object of the present invention is to provide a probe microscope having a probe needle which can be inserted into trenches having a high aspect ratio and like structure.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a probe microscope, including a probe needle arrangement having a probe needle part, and a detection part connected to, and formed along the same axis as, the probe needle part; a displacement detector that detects changes in a condition of the probe needle part; and a movement device that drives the probe needle arrangement relative to a sample surface to be measured.

In another aspect of the present invention, there is provided a method for detecting an interaction force between a probe needle arrangement and a sample surface, the method including the steps of generating a torsional resonant vibration centered on an axis within the probe needle arrangement, the axis passing along the length of the probe needle arrangement and being substantially perpendicular to the sample surface; and detecting the interactive force from changes in the torsional resonant vibration.

In another aspect of the present invention, there is provided a probe needle arrangement movement method in a probe microscope, the method including the steps of exciting a torsional resonant vibration in the probe needle arrangement; moving the probe needle arrangement relative to a sample; detecting changes in an interaction force between the probe needle arrangement and the sample by detecting changes in the torsional resonant vibration; and determining a further direction of movement of the probe needle arrangement in a relation to a current placement of the probe needle arrangement and an amount of change in the interactive force when a change in the interactive force is detected.

In another aspect of the present invention, there is provided a method of imaging the surface profile of a sample using a probe needle arrangement of a probe microscope, the method including the steps of generating a torsional resonant vibration in the probe needle arrangement; moving the probe needle arrangement towards the sample; detecting changes in an interaction force between the probe needle arrangement and the sample by detecting changes in the torsional resonant vibration; determining a further direction of movement of the probe needle arrangement in relation to a current placement of the probe needle arrangement and an amount of changes of the current interaction force each time a change in the interaction force is detected; storing data corresponding to each of the new directions of movement determinations in a memory unit; and imaging the surface profile of the sample from the data corresponding to each of the further directions of movement determinations stored in the memory unit.

In another aspect of the present invention, there is provided a probe needle arrangement movement method in a probe microscope, the method including steps of moving the probe needle arrangement relative to a sample; detecting changes in an interaction force between the probe needle arrangement and the sample and determining a further direction of movement of the probe needle arrangement in relation to a current placement of the probe needle arrangement and an amount of change in the interactive force when a change in the interactive force is detected.

In another aspect of the present invention, there is provided a method of imaging the surface profile of a sample using a probe needle arrangement of a probe microscope, the method including steps of moving the probe needle arrangement towards the sample; detecting changes in an interaction force between the probe needle arrangement and the sample; and determining a further direction of movement of the probe needle arrangement in relation to a current placement of the probe needle arrangement and an amount of change in the interaction force when a change in the interaction force is detected.

In a further aspect of the present invention, there is provided a probe needle for use in a probe microscope, including a probe needle part; and a detection part connected to, and formed along the same axis as, the probe needle part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
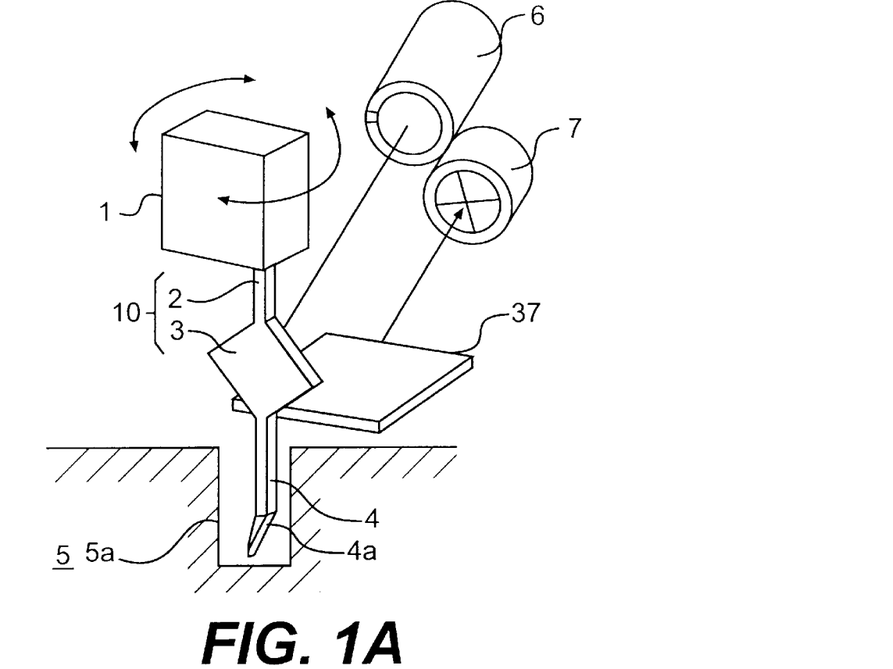
FIG. 1A schematically illustrates a probe needle of a scanning type probe microscope in accordance with a first preferred embodiment of the present invention.

FIG. 1A shows the probe needle arrangement and associated components according to a first preferred embodiment of the present invention. This arrangement detects the displacement of the probe needle by means of light.

Figure 1B:
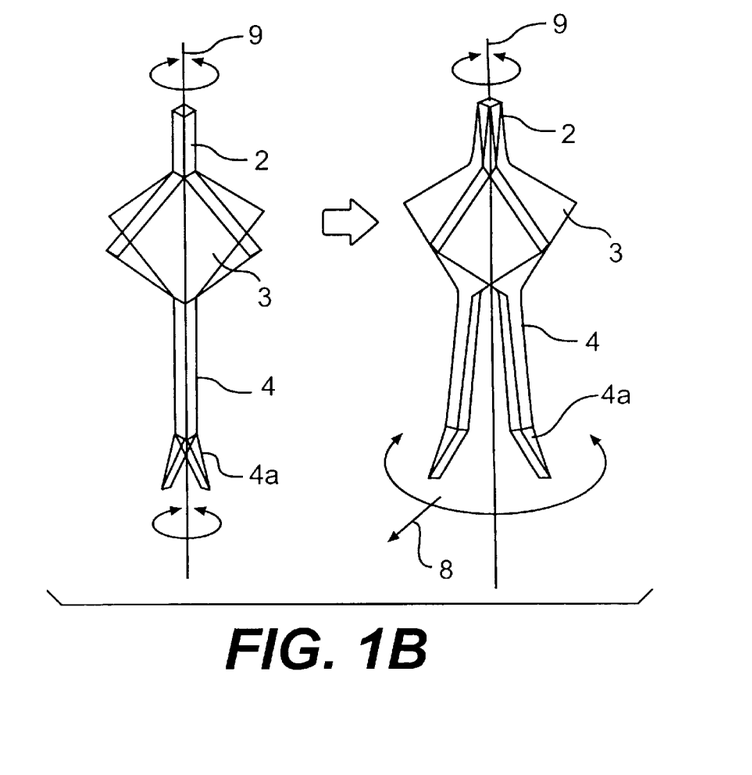
FIG. 1B illustrates vibrational modes of the probe needle shown in FIG. 1A.

FIG. 1B shows how the vibrational state varies when a torsional vibration is caused to occur in the probe needle, and when the interaction force (e.g., atomic force) is generated between the probe needle and the sample.

In the probe microscope shown in FIG. 1A, the probe needle arrangement is constructed from a connecting part 2, a detection part 3, and a probe needle part 4. A supporting part 10 is formed by the connecting part 2 and detection part 3. The supporting part 10 and probe needle part 4 may be continuously formed and have substantially the same axis.

In the example shown in FIG. 1A, the probe needle part 4 extends from a square detection part 3, and includes a tip end portion 4a which is bent in the form of a beak at the tip end of the probe needle part 4. The width of the probe needle part 4 is preferably 200 nm or less, for example, 100 to 200 nm, and has a length of preferably one micron or greater, for example, approximately three microns. The tip end portion 4a of the probe needle part 4 is formed so that it gradually narrows to a sharp tip end. Since this type of probe needle part 4 is long and slender, it can easily be inserted into trenches 5a formed in a sample 5, such as a semiconductor substrate. The tip end portion 4a of the probe needle part 4 shown in FIG. 1A is bent in the form of a beak. However, it is not required that the tip end portion 4a be bent.

The detection part 3 has a flat plate-form shape which is approximately fifty microns on is side. Accordingly, the width of the detection part 3 is considerably larger than the width of the probe needle part 4. Furthermore, the detection part 3 has a light-reflecting surface that reflects light from a light source 6 such as a laser, for example, and the reflected light is directed toward a light-receiving element 7. In FIG. 1A, the light from the light source that is reflected by the reflective surface of the detection part 3 is reflected by a reflecting mirror 37, and is then incident on a four-part light-receiving element 7. The shape of the detection part 3 is not limited to a square shape. Various shapes, such as circular, elliptical, rectangular, and the like, may be selected for the detection part 3. Furthermore, as a result of the width of the detection part 3 being larger than that of the probe needle part 4, the detection part 3 acts as a mass part in situations where a torsional vibration centered on the axis along the length of the probe needle part 4 is applied to the probe needle part 4. Thus, connecting part 2, the detection part 3, and probe needle part 4 set the resonance frequency of torsional vibrations.

The connecting part 2 is connected to a supporting body 1. The width of the connecting part 2 is considerably smaller than that of the detection part 3. Accordingly, when an external force acts on the probe needle part 4, the connecting part 2 is affected and bent.

The supporting body 1 is, for example, a flat plate which has a size on the order of millimeters. This supporting body 1 holds the connecting part 2. The supporting body 1 is caused to perform a torsional motion in the directions as indicated by the arrows in FIG. 1B by a driving unit which is not shown in FIG. 1A. As a result, the probe needle part 4 undergoes a torsional vibration via the connecting part 2 and detection part 3, as shown in FIG. 1B.

Figure 2A:
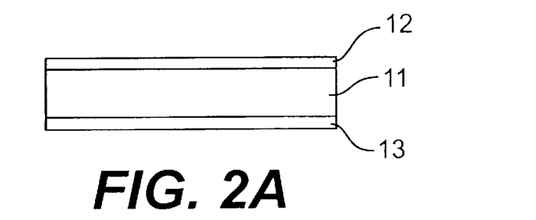
FIGS. 2A–2H are diagrams which illustrate the manufacturing process of the probe needle of the first preferred embodiment of the present invention.

A manufacturing process of a probe needle arrangement which has such a structure will now be described. FIGS. 2A–2H show the manufacturing process used in the situation where the tip end portion 4a of the probe needle part 4 of the probe needle arrangement shown in FIG. 1A is rectilinear. For example, a single-crystal silicon substrate with a thickness of 250 microns and a (100) surface orientation is prepared as the substrate 11. FIG. 2A illustrates that silicon nitride films 12 and 13 with a thickness of 0.1 microns, for example, are formed on both sides of the substrate 11 by an LP-CVD process (low-pressure Chemical Vapor Deposition process), for example.

Figure 2B:
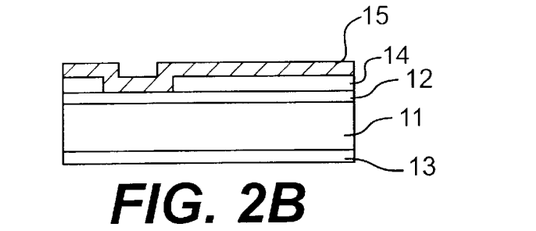
Figure 2C:
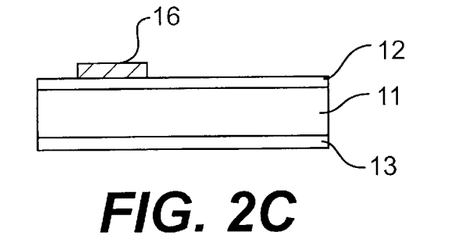

The surface of the silicon nitride film 12 on the substrate 11 is coated with a resist 14, and, for example, a square opening part corresponding to a mirror area is formed using a lithographic process. A thin nickel-chromium layer is vacuum-evaporated on the surface of this opening part. Gold 15 (the portion indicated by the cross-hatching in FIG. 2B) is further vacuum-evaporated over the entire surface of this nickel-chromium layer (FIG. 2B). The resist 14 is then removed using a lift-off process, and a gold mirror part 16 (portion indicated by the cross-hatching in FIG. 2C) is formed on the surface of the silicon nitride film 12 (FIG. 2C). The shape of the mirror part 16 is similar to the shape of the detection part 3 of the probe needle.

Figure 2D:
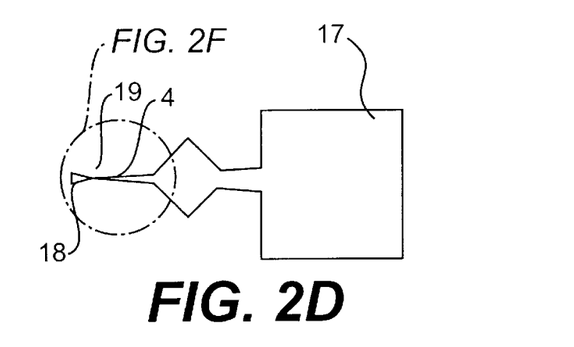

The silicon nitride films 12 and 13 and the mirror part 16 are coated with a resist 17. Using a lithographic process, the shapes of the supporting body 1, connecting part 2, detection part 3, probe needle part 4, and thin-film part 18 are patterned in the resist 17. The plan view of the resist 17 after this patterning in the resist 17 is shown in FIG. 2D. In this arrangement, the patterning is performed so that the boundary area 19 between the portion corresponding to the probe needle part 4 and the thin-film part 18 has an extremely narrow width, thus insuring that the tip end portion 4a of the probe needle part 4 will be isolated from the thin-film part 18 by the isotropic etching treatment that is performed later. (See FIG. 2F, which is an enlargement of the circled portion of FIG. 2D).

Figure 2E:
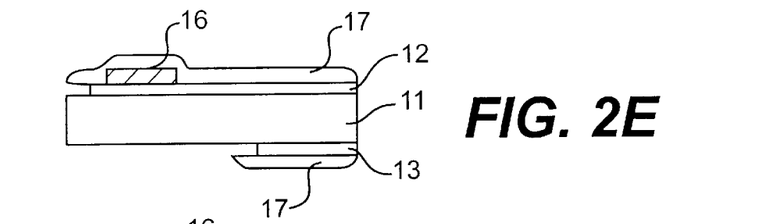

Afterward, the unnecessary portions of the silicon nitride films 12 and 13 on the top surface and undersurface of the substrate 11 are removed by isotropic etching (see FIG. 2E). In this situation, because the silicon nitride film 12 is isotropically etched, side etching occurs in the silicon nitride film 12 that is protected by the resist 17. As a result of this side etching, the portion of the silicon nitride film 12 that forms the probe needle part 4 has a narrower width than the portion of the resist 17 that corresponds to the probe needle part 4. This is indicated by the broken lines in FIG. 2F. Specifically, the solid line in FIG. 2F indicates the pattern of the resist 17, and the broken line indicates the isotropically under-etched silicon nitride film 12.

Figure 2F:
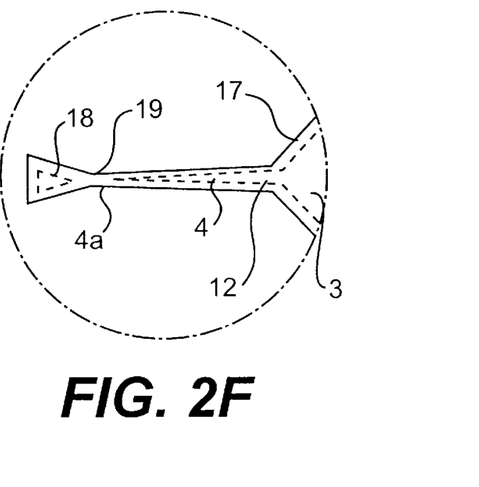

FIG. 2F further illustrates that the portion of the silicon nitride film 12 that forms the probe needle part 4 is narrower than the configuration of the resist 17 as a result of the over-etching. Moreover, as a result of over-etching beneath the constricted boundary area portion 19 of the resist 17, the thin-film part 18 of the silicon nitride film 12 and the probe needle part 4 of the silicon nitride film 12 are isolated from each other. As a result, the tip end portion 4a of the part of the silicon nitride film 12 that forms the probe needle part 4 is sharply narrowed and extremely pointed.

Figure 2G:
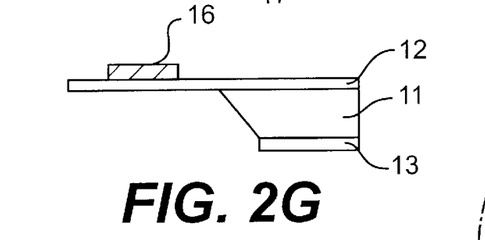
Figure 2H:
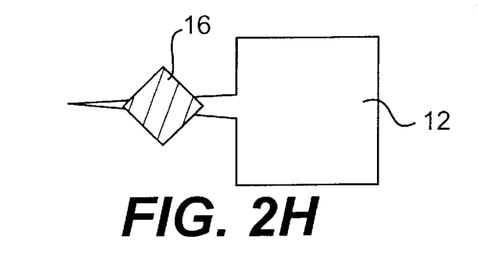

As illustrated in FIG. 2G, the resist 17 is then removed. The sample is dipped in an etching solution used for silicon, such as an aqueous solution of potassium hydroxide (KOH) or an aqueous solution of tetramethylammonium hydroxide (TMAH), for example. Consequently, the exposed portions of the substrate 11 that are not covered by the silicon nitride films 12 or 13 are removed by isotropic etching. See FIG. 2G and its plan view of FIG. 2H. As a result, a probe microscope probe needle constructed of a silicon nitride film and gold can be inexpensively manufactured in a unified manner using semiconductor manufacturing technology.

A probe microscope using the probe needle arrangement shown in FIG. 1B will now be described. In the probe needle arrangement of this probe microscope, the probe needle part 4 is long and slender, and can therefore easily be inserted into trenches 5a formed in a sample substrate, such as a semiconductor substrate 5. When an interaction force acts between the tip end portions 4a or side surface portions of the probe needle part 4 and the inside walls, such as the side walls or bottom surface, of the trench 5a, the probe needle bends in accordance with the magnitude of the interaction force. The change in the angle of the detection part 3 caused by this bending can be detected by an optical lever method, for example. Specifically, as described above, the detection part 3 is illuminated with laser light transmitted from a light source 6, and the reflected light is received by a light-receiving element 7, such as a split type photodiode, for example (FIG. 1A). Changes in the angle of the detection part 3 can be detected with a high sensitivity for changes in the position of the reflected light received by the light-receiving element 7. Furthermore, since the magnitude of the interaction force varies according to the distance between the probe needle part 4 and the sample 5, the probe microscope can detect changes in the distance between the probe needle part 4 and sample 5 by detecting changes in the inclination of the plane of the detection part 3. A four-part photodiode or a two-part photodiode, whose parts are split in the direction of movement of the reflected light, can be used as the light-receiving element 7, for example.

Figure 3:
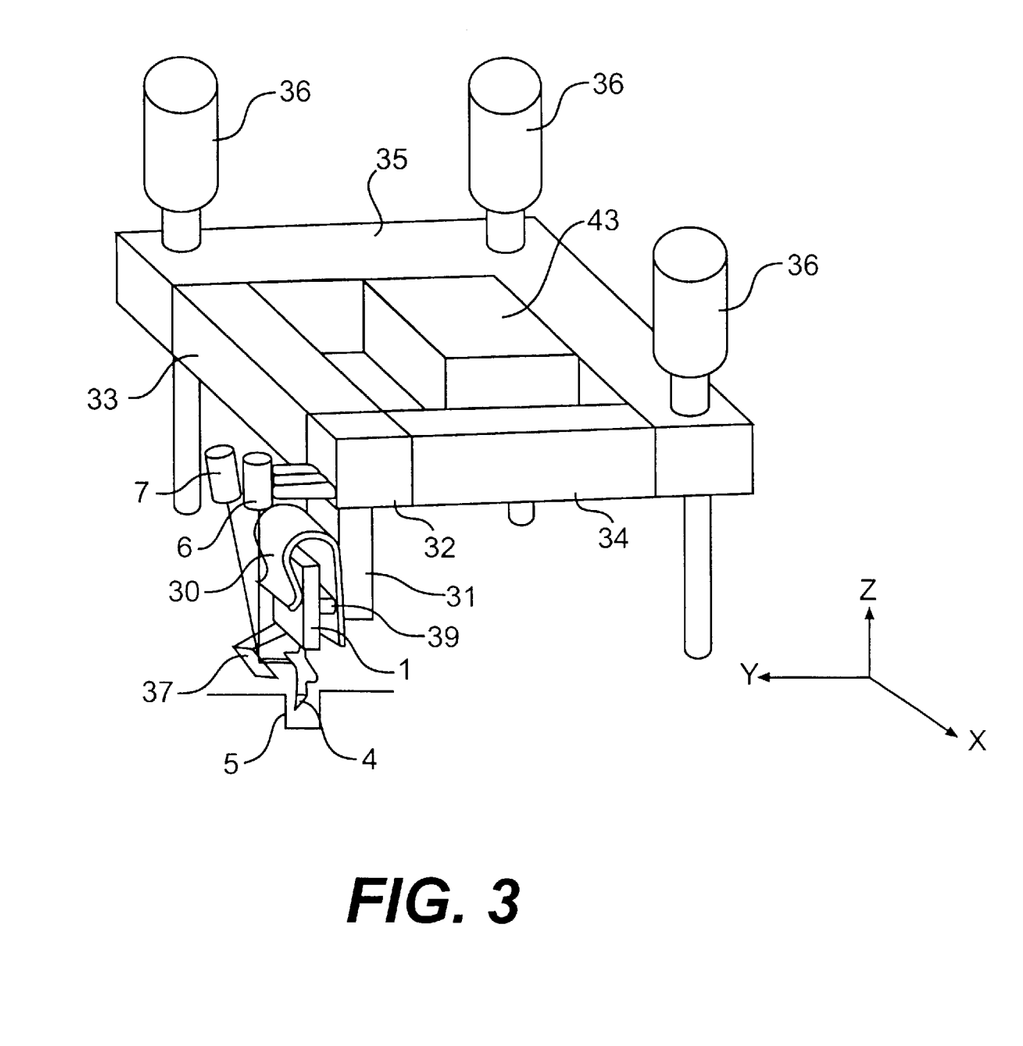
FIG. 3 is a structural diagram which illustrates the mechanical portions of the first preferred embodiment of the probe microscope of the present invention.

FIG. 3 provides a schematic illustration of the construction of the probe microscope according to a preferred embodiment of the present invention. This probe microscope can monitor a predetermined measurement area by a raster-scan operation of a probe.

The supporting body 1 of the probe needle arrangement is held by a clip 30 on the free end of a PXT element (piezo-electric element) 31 which is used for driving the probe needle arrangement in the Z-direction. The other end of the PZT element 31 used for driving the arrangement in the Z-direction is fastened to a block 32. The respective free ends of a PZT element 33 used for driving the arrangement in the X-direction and a PZT element 34 used for driving the arrangement in the Y-direction are fastened to the block 32, and the respective fixed ends of the PZT elements are fastened to a frame 35. The frame 35 is supported by three height-adjustable support structures 36 that are provided to vary the height of the frame on the order of micrometers. The light source 6 and light-receiving element 7 are fastened to the block 32 after the positions of these parts have been respectively adjusted. Furthermore, a mirror 37 is fastened to the clip 30. The output signal from the light-receiving element 7 is input into a pre-amplifier 43 which is installed on the frame 35 to process the signal. A vibrator 39 including a PZT, for example, which is used for the non-contact mode detection, is installed on the surface of the clip 30 to support the supporting body 1 of the probe needle arrangement.

Figure 4:
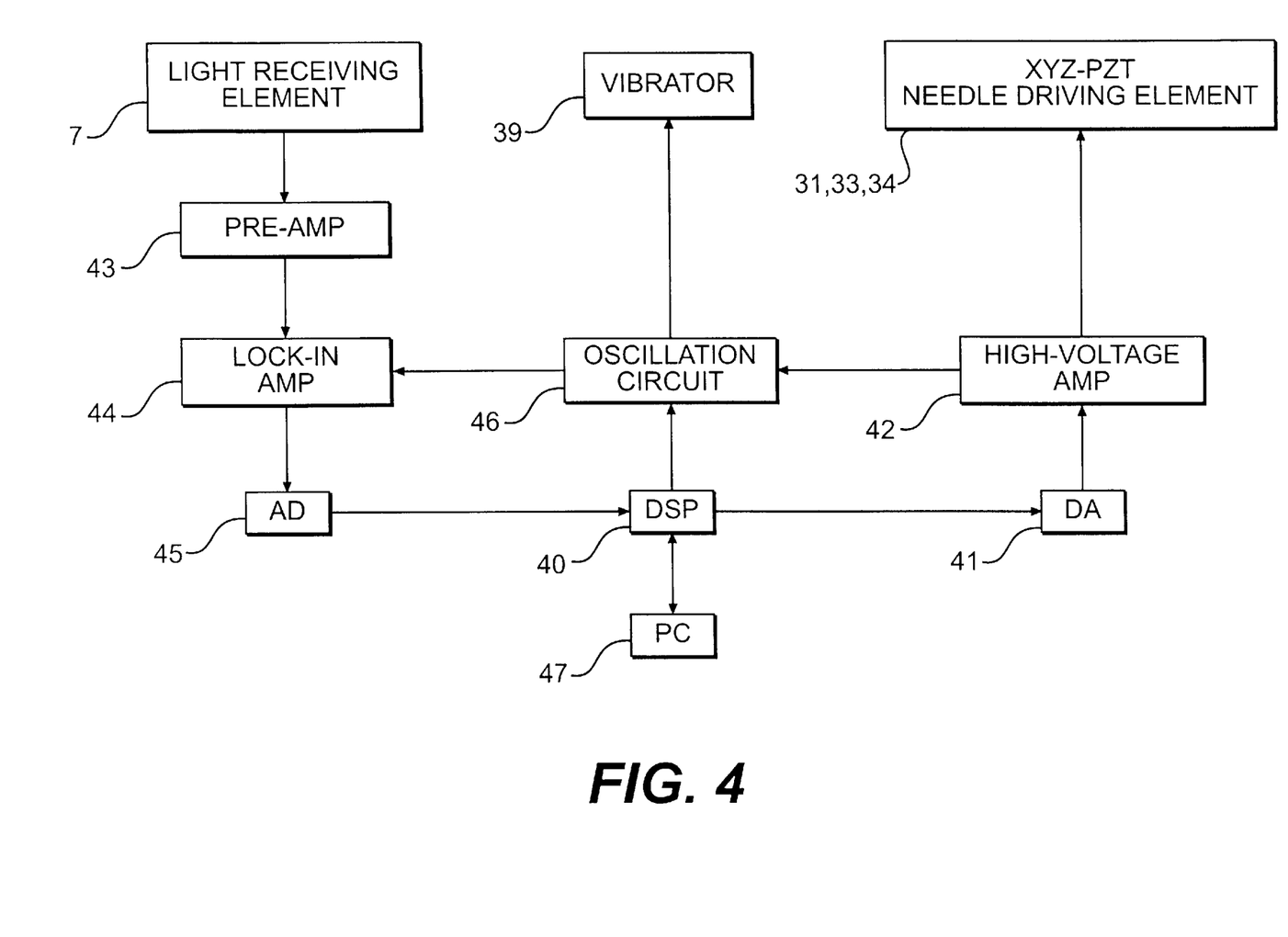
FIG. 4 is a block diagram of the probe microscope shown in FIG. 3.

A schematic block diagram of the electrical control system is shown in FIG. 4. First, a method for contact mode imaging is described. In this contact mode, the vibrator 39, lock-in amplifier 44, and oscillation circuit 46 are not used. A probe needle driving signal generated by a digital signal processor (DSP) 40 is converted into a voltage by a digital to analog (D/A) conversion circuit 41. This voltage is then amplified at a high-voltage amplifier 42, and is applied to the probe needle driving PZT elements 31, 33, and 34. As a result, the probe needle moves in the directions parallel to the surface of the sample 5. Meanwhile, the light from the light source 6 is reflected by the detection part 3 and received by the reflecting mirror 37. Then, the position of the spot of the reflected light that is reflected by the detection part 3 via the mirror 37 is detected by the light-receiving element 7. The signal from the light-receiving element 7 is amplified by the pre-amp 43 and input into an analog to digital (A/D) converter 45. Then, this signal is digitized by the A/D converter 45 and input into the DSP 40.

While the probe needle part 4 is moving along the surface of the sample 5, the relative distance between the sample 5 and the probe needle part 4 is maintained at a constant value. This is accomplished, for example, in the following manner. On the basis of the signal output from the light-receiving element 7, the DSP 40 outputs a feedback signal to the D/A converter 41, and the analog signal produced by conversion in the D/A converter 41 is applied to the PZTs 31 and 33 for driving in the Z and X directions via the high-voltage amplifier 42. Furthermore, the feedback signal reflects the surface shape of the sample 5, and is displayed on a display by a personal computer 47 which is connected to the DSP 40. Moreover, the associated data are stored in the personal computer 47.

Thus, in this method, the probe needle part 4 scans the surface of the sample 5 while contacting the sample 5, and the force acting between the probe needle part 4 and the sample 5 is detected. This method is referred to as the "contact mode." there is another mode called "non-contact mode," which will now be described. In the "non-contact" mode, the force acting between the probe needle part 4 and the sample 5 is detected without causing the probe needle to contact the sample 5.

FIG. 1B shows the movement of the probe needle part 4 when the non-contact mode is used to detect the force acting between the probe needle part 4 and the sample 5. A resonant vibration of a reciprocating rotational (twist) motion centered on the central axis 9 of the probe needle arrangement constructed from the connecting part 2, detection part 3, and probe needle part 4, for example, a "torsional resonance" is excited in the probe needle arrangement. This torsional resonance is excited in the probe needle arrangement by vibrating the supporting body 1 of the probe needle arrangement at a frequency equal to the resonance frequency of the probe needle arrangement via a vibrator, for example.

In a state in which this torsional resonance is excited, the probe needle part 4 is inserted into trench 5. When an interaction force, such as van det Waals force 8 (FIG. 1B) or the like, acts on the tip end portion 4a and/or side surface portions of the probe needle part 4, the probe needle part 4 is pulled in the direction in which the force acts.

In this case, the detection part 3 and probe needle part 4 deviate from the rotational axis 9 of the resonant vibration. Accordingly, the moment of inertia about the rotational axis 9 increases abruptly. When the moment of inertia increases, the resonance frequency in the torsional vibration (torsional vibration about the rotational axis 9) decreases. As a result, the probe needle is removed from a state of the torsional resonance, so that the amplitude of the torsional rotational vibration of the detection part 3 drops. This change in the vibration amplitude of the detection part 3 is detected by the optical lever method, for example. Thus, the interaction between the probe needle part 4 and the sample 5 is detected. Normally, the position of the probe needle arrangement with respect to the sample 5 is controlled so that this interaction force is constant.

In such a probe needle arrangement, the connecting part 2, detection part 3, and the probe needle part 4 are formed along substantially the same axis 9, and a reciprocating rotational motion, i.e., torsional vibration (a twist vibration), which is centered on the axis 9, is excited. Accordingly, there are few mechanical or spatial restrictions on the scanning operation of the probe needle part 4. As a result, even in the case of a narrow groove, such as a semiconductor trench, the probe needle part 4 can easily be inserted into the trench with the torsional vibration. As a result of this construction, the interaction between the probe needle part 4 and sample 5 can be detected in a non-contact manner.

Furthermore, when a force acts on the probe needle part 4, the resonance frequency changes as a result of the increase in the inertial moment. Accordingly, as an alternative method, the force acting between the probe needle part 4 and the sample 5 may be detected by detecting changes in the resonance frequency.

Figure 5:
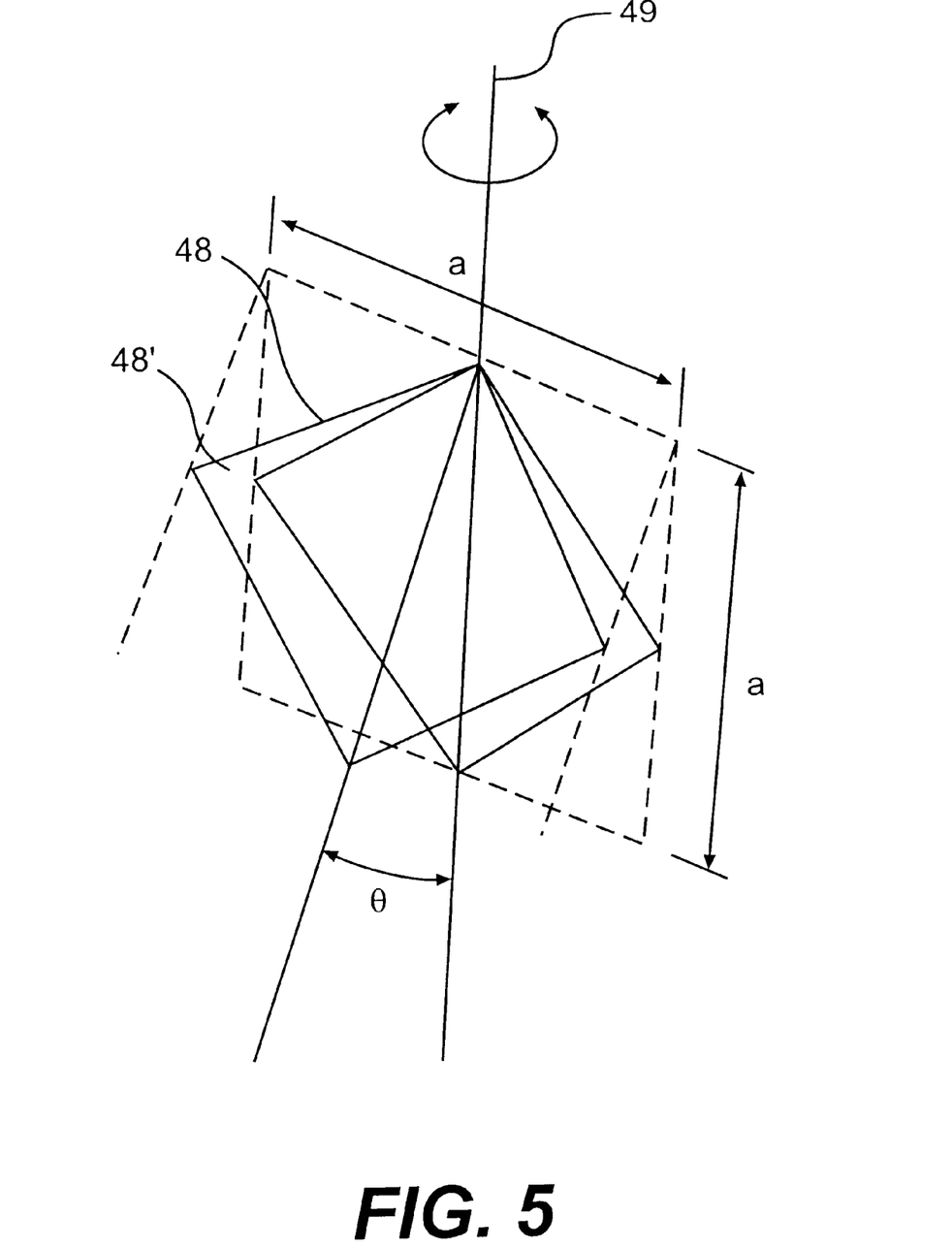
FIG. 5 is a graphical diagram which is used to illustrate the measurement principle of the present invention, illustrating a state in which the objective is inclined from the axis by an angle of θ.

The sensitivity of this force detection method is discussed next. In order to calculate the changes in the moment of inertia of the probe needle arrangement, calculations are performed using a model for the detection part 3, which mostly contributes to the moment of inertia. In FIG. 5, a square object 48 with a surface mass density of ρ and a diagonal length of a is shown as a model of the detection part 3. FIG. 5 also shows a state in which this model object 48 is inclined by an angle θ from the axis dividing the object into left and right parts. (This state is indicated by 48'.) The moment of inertia I of the inclined object 48' with respect to the axis 49 is expressed by Equation (1)

$$I(\theta)=a^4\rho/48+7a^4\rho\sin^2\theta/48 \tag{1}$$

In recent times, a 0.1 mHz frequency shift can be measured by the frequency modulation method. Suppose that the torsional resonance frequency of the probe needle is 100 kHz, and that the angular shift of the object 48 from the rotational axis 49 when the torsional resonance frequency shifts from 100,000 Hz to 99,999.9999 Hz is θ. Then, since the resonance frequency is proportional to the square root of the moment of inertia, the following Equation (2) holds true.

$$100,000:99,999.9999 = \frac{1}{\sqrt{I(0)}} : \frac{1}{\sqrt{I(\theta)}} = \sqrt{1+7\sin^2\theta} : 1 \tag{2}$$

Thus, θ is determined to be about seventeen micro radians.

If the length of the tip from the connecting part 2 is fifty microns (for example, a is approximately fifty microns), the shift of the tip end portion 4a of the probe needle from the rotational axis when the probe needle is bent by approximately seventeen micro radians is approximately 0.8 nm. Accordingly, in the method of the present embodiment in which a torsional resonance is excited in the probe needle to detect the force acting between the probe needle part 4 and the sample 5, an extremely small force which causes the tip end portion 4a of the probe needle to move approximately 0.8 nm can be detected. As a result, this arrangement provides a sufficiently high force detection sensitivity.

The operation of the probe microscope for imaging the sample surface profile by exciting a torsional resonance in the probe needle arrangement and detecting the force acting between the probe needle part 4 and the sample 5 will be described with reference to FIGS. 3 and 4.

A sine wave having a frequency substantially equal to the torsional resonance frequency of the probe needle arrangement is generated by the oscillation circuit 46 controlled by the digital signal processor (DSP) 40, and is input into the vibrator 39. As a result, the vibrator 39 causes the supporting body 1 of the probe needle arrangement to vibrate, so that a torsional resonance is generated in the connecting part 2.

Meanwhile, the light emitted by the light source 6 illuminates the detection part 3 of the probe needle arrangement via the mirror 37. Then, the position of the reflected light is detected by the light-receiving element 7, which includes a four-part photodiode, for example. The signal output form the light-receiving element 7 varies according to the status of torsional vibration of the probe needle arrangement. This signal is amplified by the pre-amplifier 43, and is input into the lock-in amplifier 44. The lock-in amplifier 44 amplifies and outputs only the frequency component that is substantially equal to the resonance frequency, corresponding to the frequency of the sine-wave input into the vibrator 39 from the oscillation circuit 46. The signal from the pre-amplifier 43 thus is amplified by the lock-in amplifier 44, is digitized by the A/D converter 45, and is input into the DSP 40. The DSP 40 performs servo calculations necessary for maintaining the relative distance between the sample 5 and the probe needle part 4 at a constant value even when variations in the interaction force between the sample 5 and the probe needle part 4 occur, and outputs a resultant feedback signal to the D/A converter 41. This feedback signal is applied via the amplifier 42 to the PZT element 31 for driving the arrangement in the Z direction. The feedback signal reflects the surface profile of the sample 5, and is displayed on a display by a personal computer 47 connected to the DSP 40. The associated data is also stored in the computer 47.

Figure 6:
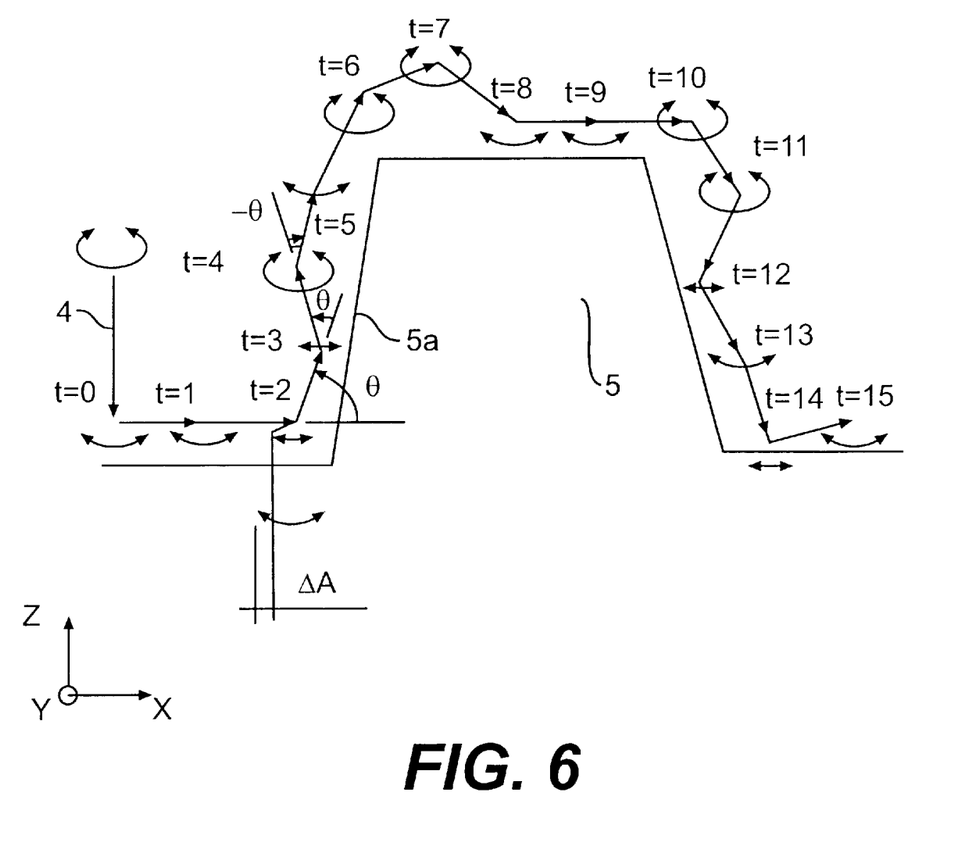
FIG. 6 is a diagram which illustrates an example of the control flow of the probe needle part in the probe microscope of the present invention.

Next, a method that can be used to trace the surface of the sample 5 using this probe needle arrangement will be described. FIG. 6 is a diagram which shows the conditions of the amplitude in the torsional direction of the probe needle part 4 of the probe microscope of the present embodiment. In FIG. 6, the amplitude in the torsional direction of the probe needle part 4 is represented by the length of the arrows. The driving of the probe needle arrangement in the present embodiment is performed according to the flow chart shown in FIG. 7.

Figure 7:
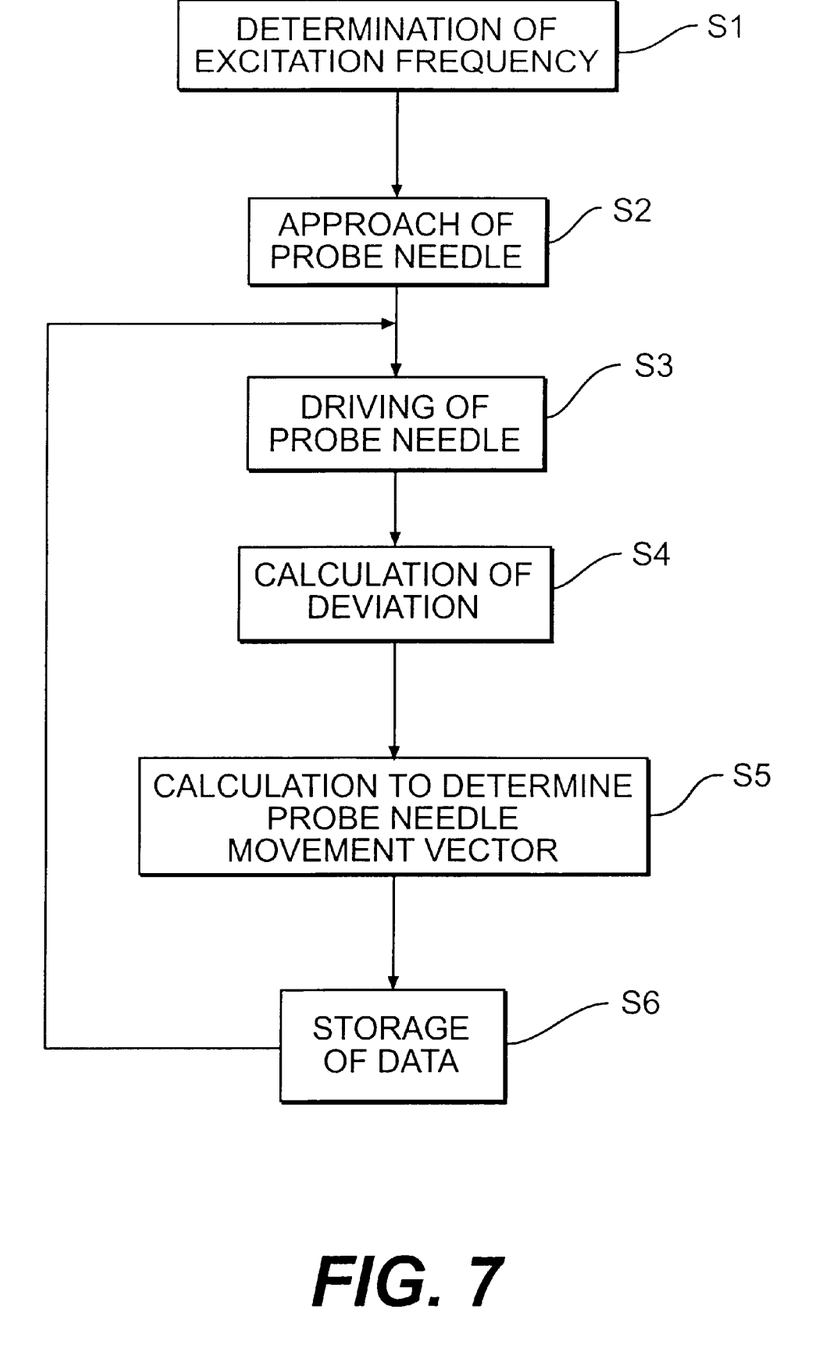
FIG. 7 is a flow chart of the steps executed by a digital processor in the control flow of FIG. 6.

First, the DSP 40 performs an auto-tuning operation (step S1). Specifically, the DSP 40 obtains a signal from the A/D converter 45 while varying the excitation frequency that is output by the oscillation circuit 46. Then, the optimum excitation frequency used in subsequent operations is automatically determined on the basis of the signal from the A/D converter 45. Afterward, the DSP 40 continues to operate the oscillation circuit 46 using thus determined excitation frequency.

Next, the DSP 40 outputs a signal to the D/A converter 41 so that the probe needle arrangement approaches the sample at a predetermined position. The D/A converter 41 drives the Z-PZT element 31 via the amplifier 42. Then, when the signal output from the A/D converter 45 reaches a prescribed target value, the DSP 40 stops the driving command to the Z-PZT element 31, and the approach of the probe needle part 4 to the sample 5 is stopped (step S2). These steps S1 and S2 constitute the preparatory stage of measurement.

Afterward, the DSP 40 generates movement commands according to an updated probe needle movement vector obtained at each current point in time, and moves the probe needle arrangement in accordance with the probe needle movement vector (step S3). Each probe needle movement vector is a driving vector which indicates the movement direction and movement distance from the position at the current point in time to the position at the next point in time to which the probe needle arrangement is to be driven by one driving step. However, in the case of the first shift from step S2 to step S3, the movement vector has not yet been obtained, since the processing has not yet passed through steps S4, S5, and S6, which will be described later. Accordingly, in the present example, a vector that has a direction parallel to the plane of the sample is used as an initial probe needle movement vector.

When the probe needle arrangement has moved the prescribed distance, the DSP 40 inputs the detected value of the amplitude of the torsional vibration of the probe needle arrangement form the A/D converter 45 and calculates the deviation ΔA between the current amplitude of the torsional vibration of the probe needle arrangement and the amplitude of the torsional vibration of the probe needle arrangement prior to the moving of the probe needle arrangement by the aforementioned prescribed distance (step S4).

Afterward, the DSP 40 determines a new probe needle movement vector by calculations using Equation (3) and Equation (4) on the basis of the deviation ΔA calculated in step S4 (step S5), as follows.

Then, the DSP 40 first determines the angular difference θ between the direction of movement up to this point and the new direction of movement from the aforementioned deviation ΔA using Equation (3):

$$\theta = \text{ArcTan}(G \cdot \Delta A), \quad (3)$$

Where G is a constant.

The DSP 40 then derives a matrix representing vector rotation shown in Equation (4) below. Using this matrix equation, the prior probe needle movement vector ($X_n$, $Z_n$) indicating the direction of movement up to this point is rotated by the angle θ with respect to the prior direction of movement within the X–Z plane (FIG. 6). As a result, a new probe needle movement vector ($X_{n+1}$, $Z_{n+1}$) is determined.

$$\begin{pmatrix} X_{n+1} \\ Z_{n+1} \end{pmatrix} = \begin{pmatrix} \cos\theta & \sin\theta \\ -\sin\theta & \cos\theta \end{pmatrix} \begin{pmatrix} X_n \\ Z_n \end{pmatrix} \quad (4)$$

Here, the direction of scanning of the probe needle arrangement parallel to the surface of the sample is taken as the X direction, and a direction perpendicular to the surface of the sample is taken as the Z-direction. Furthermore, the X-direction component and Z-direction component of the probe needle movement vector indicating the direction of movement up to this point are indicated as Xn and Zn, respectively. Moreover, the X component and Y component of the probe needle movement vector (newly obtained probe needle arrangement driving vector) of the next point in time t=n+1 obtained by the above-mentioned rotation by θ are designated as $X_{n+1}$ and $Z_{n+1}$, respectively, so that the relationship shown in Equation (4) is obtained. Here, n is an integer equal to or greater than zero.

Following step S5, the DSP 40 stores the new probe needle movement vector determined in step S5 in a memory in the DSP 40 (step S6). When step S6 is completed, the processing returns to step S3 and the operations of steps S3 through S6 are repeated. When the probe needle part 4 reaches a prescribed position in the X-direction as a result of the repetition of the operations in steps S3 through S6 (i.e., when the probe needle arrangement has traced a prescribed range in the X-direction), the DSP 40 generates a movement command which causes the probe needle arrangement to move a prescribed distance in the Y-direction. Then, steps S3 through S6 are repeated in the XZ plane at that Y-direction position. These operations are repeated so that the probe needle part 4 scans a prescribed two-dimensional range in the XY plane. After scanning the entire range, measurement is completed. Thus, in the present embodiment, steps S3 through S6 are repeated at each Y-direction position. However, it would also be possible to repeat steps S3 through S6 at only one Y-direction position.

In accordance with the foregoing description, the probe needle movement vectors successively stored in step S6 reflect the surface profile of the sample. The computer 47 displays the sample surface profile obtained on the basis of the stored probe needle movement vectors on a monitor, for example.

Next, the determination of the probe needle movement vectors will be described in more detail using FIG. 6. First, a torsional vibration is generated in the probe needle part 4 at a position distant from the sample 5. Then, the probe needle part 4 is caused to approach the sample 5 until a predetermined amplitude is reached. The instant in time at which this approach is completed is taken as the instant in time at which measurement is initiated, for example, t=0. The amplitude of the torsional resonance of the probe needle part 4 at various instants in time is indicated by the length of the curved arrows, and the amplitude at time t=0 is taken as a reference value.

The probe needle part 4 is first moved by a predetermined probe needle movement vector. Then, when the time t=2 is reached, the distance between the probe needle part 4 and the side wall of the sample 5 becomes short. Accordingly, an interaction force (for example, van der Waals force) acts between the sample side wall 5a and probe needle part 4, so that the amplitude of the torsional vibration in the probe needle part 4 decreases. The amount of change in the amplitude of the torsional vibration relative to the target value in this case is determined according to the output of the A/D converter.

Even if the shape of the probe needle arrangement is different from that of the above-mentioned example, a similar probe needle arrangement driving procedure can be applied by detecting changes with respect to a certain reference state, and then determining the direction of movement of the probe needle arrangement on the basis of the amount of variation.

The above-mentioned probe needle arrangement driving procedure may be modified as follows. When the angle θ is determined according to an arctangent function, as described above, then θ is within ±90 degrees, which offers the advantage of not having to reverse the moving direction of the probe needle. However, in cases where the surface of the object of observation has extremely steep indentations and projections, there may be instances in which the sample surface can be traced more accurately if the correction amount θ is expanded to ±180 degrees. In this case, the correction amount can be set within ±180 degrees by multiplying the value of θ determined using the aforementioned arctangent function by a prescribed number (a number of 1 to 2, for example). Furthermore, the gain G in Equation (3) is simply a proportional coefficient by which the measured deviation is multiplied (proportional control). However, it would also be possible to use PDI control, for example, in which differential or integral terms taking into account frequency components are added to the gain G.

Figure 11A:
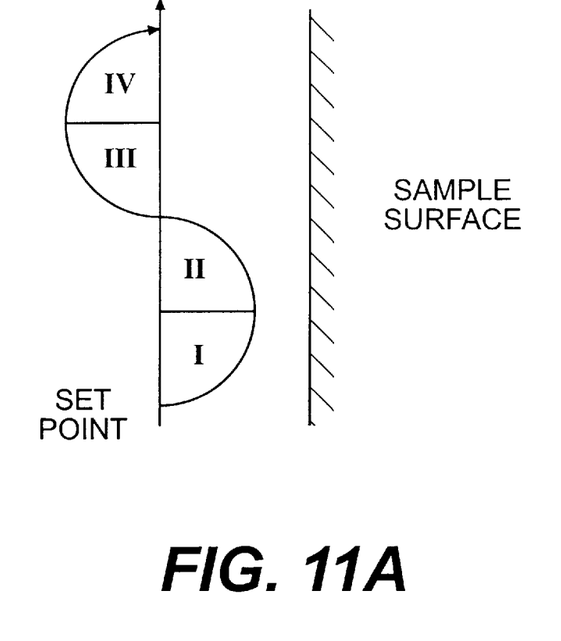
FIG. 11A is a diagram which illustrates in model form the overshoot in the control shown in FIG. 6.
Figure 11B:
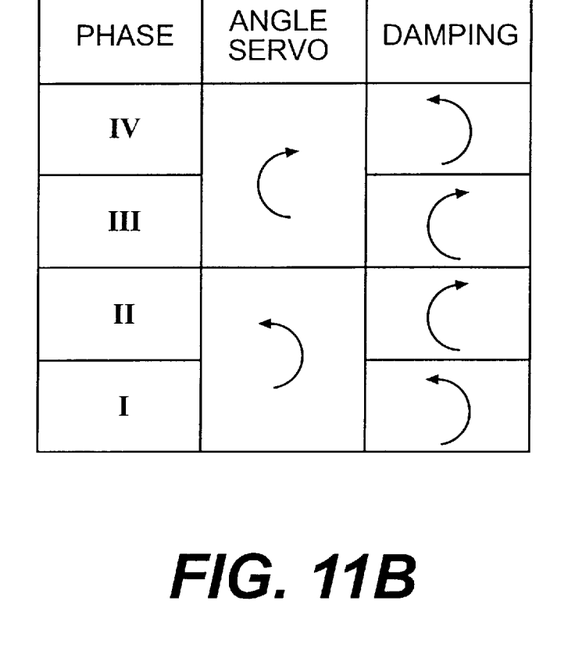
FIG. 11B is a diagram which indicates the direction in which damping is applied to the probe microscope arrangement of the present invention.

Furthermore, it is possible to improve the convergence of the servo, and thus improve the stability of the servo, by adding an effect of damping to the above-mentioned angle servo operations. FIG. 11A shows the angle servo divided into four phases. FIG. 11B shows the direction of the angle servo and the direction of damping in each of the aforementioned four phases. In phases I and II, the direction of the angle servo is the counterclockwise direction. The directions in which damping is applied are the counterclockwise direction and the clockwise direction in phases I and II, respectively. Here, phase II is particularly important for stabilizing the solution. In phase II, overshoot can be reduced by rotating the vector to the opposite orientation from the servo operation oriented in the counterclockwise direction of the angle servo. Furthermore, it is more effective if this damping component takes a larger value in regions closer to the target value. The same thing can be said for phases III and IV.

In the above description, as is shown in FIG. 3, the vibrator 39, such as a PZT device, was used in order to generate a torsional vibrational resonance in the probe needle. However, instead of using such mechanical excitation of the probe needle arrangement, it would also be possible to excite a vibration in the probe needle arrangement using an electromagnetic force. Such a probe needle arrangement is shown in FIG. 8.

This probe needle arrangement has wiring 51 made of a metal such as gold, for example, which is disposed on supporting body 1, connecting part 2, detection part 3, and two pads 52 and 53 made of a metal disposed on the supporting body 1. The wiring 51 forms a coil in the detection part 3. Also, both end portions of the wiring 51 are connected to the two pads 52 and 53 on the supporting body 1. The light-reflecting surface or mirror portion of the detection part 3 is formed inside the coil formed by the wiring 51 via a gap, so that there is no contact with the wiring 51. A Lorentz force, for example, can be generated in such a probe needle arrangement by exposing the probe needle arrangement to a magnetic field b, and causing an electric current to flow through the wiring 51 between the pads 52 and 53. By varying the direction of this flowing current at a frequency equal to the torsional vibrational resonance frequency of the probe needle arrangement, it is possible to excite the probe needle arrangement to a state of torsional resonance. Since there is no need for an external exciting mechanism such as a vibrator or the like, the system can be correspondingly simplified.

Figure 8:
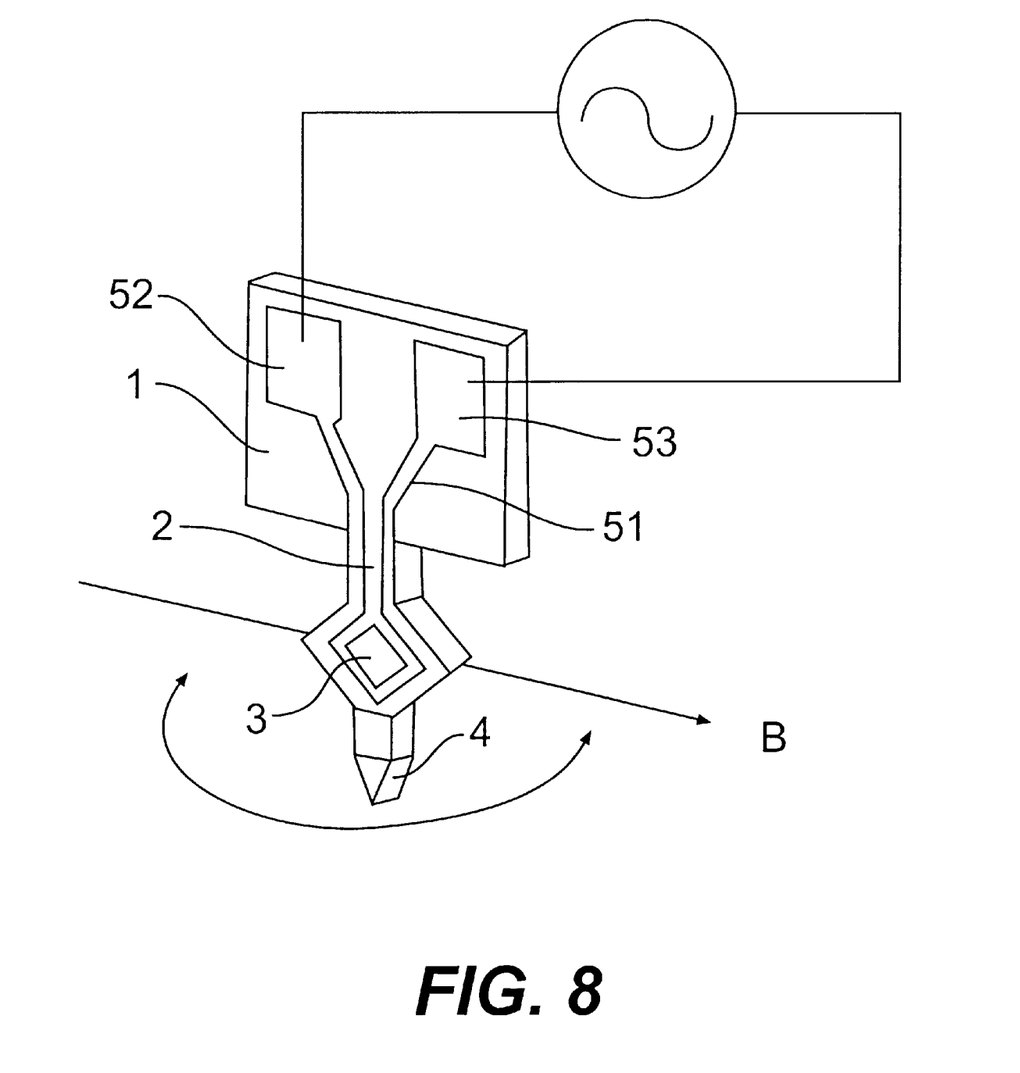
FIG. 8 illustrates the probe needle arrangement of a scanning type probe microscope in accordance with a second preferred embodiment of the present invention.
Figure 9A:
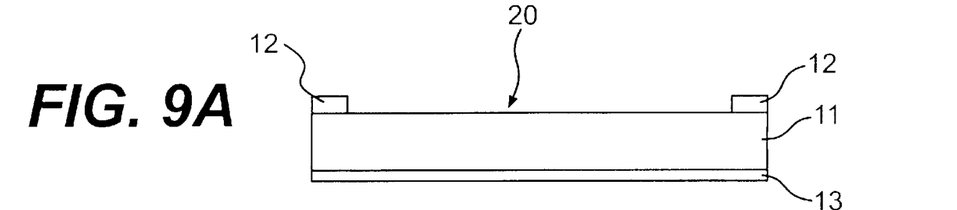
FIGS. 9A–9F illustrate the manufacturing process of a probe needle arrangement in accordance with the second preferred embodiment of the present invention.
Figure 9B:
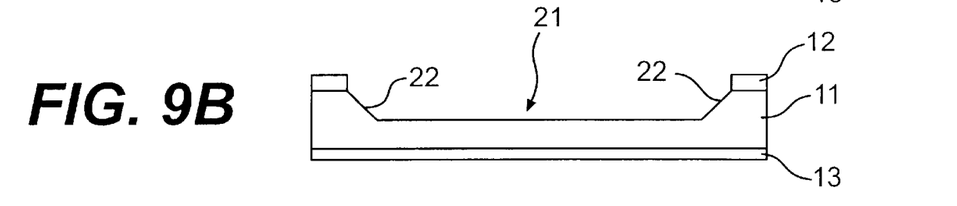

A probe needle arrangement which has wiring for generating a Lorentz force as shown in FIG. 8 can be manufactured by the process shown schematically in FIGS. 9A–9F, for example. In FIG. 9, constituent elements corresponding to like constituent elements in FIGS. 2A–2H are labeled with the same symbols. Here, silicon nitride films 12 and 13 are formed on both sides of a substrate 11 by the same manufacturing method as that described above. Furthermore, the silicon nitride film 12 is similarly patterned, and an opening 20 which exposes the substrate 11 is formed in a prescribed place of the silicon nitride film 12 (FIG. 9A). Furthermore, a groove 21 which communicates with the opening 20 and which has inclined surfaces 22 is formed in the substrate 11 by anisotropic etching (FIG. 9B).

Figure 9C:
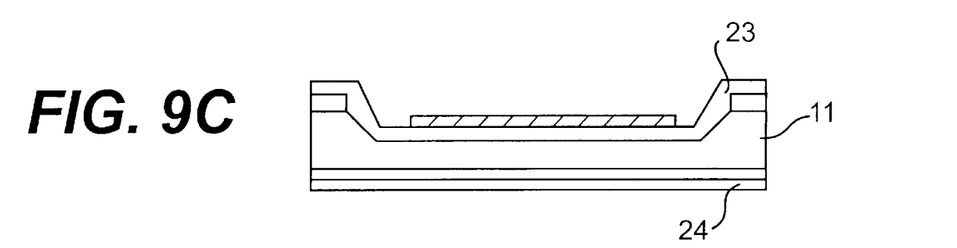

Subsequently, for example, silicon nitride films 23 and 24 each having a thickness of approximately 0.1 microns are formed on both sides of the substrate 11 by LP-CVD or like processes, and a gold layer (portion indicated by crosshatching in FIG. 9C) is patterned on the surface of the silicon nitride film 23 using a lift-off process or the like. In this case, however, unlike the case illustrated in FIG. 2C, the wiring 51 and pads 52 and 53 are also patterned along with the mirror portion 16 (FIG. 9C).

Figure 9D:
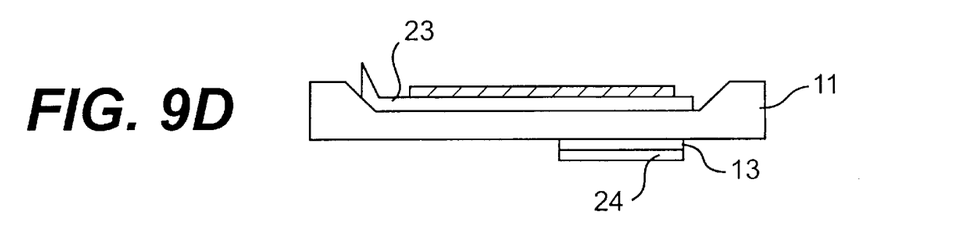
Figure 9E:
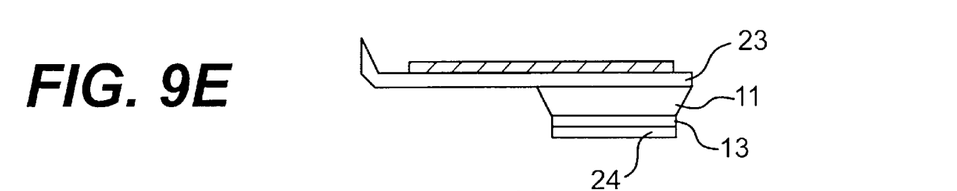
Figure 9F:
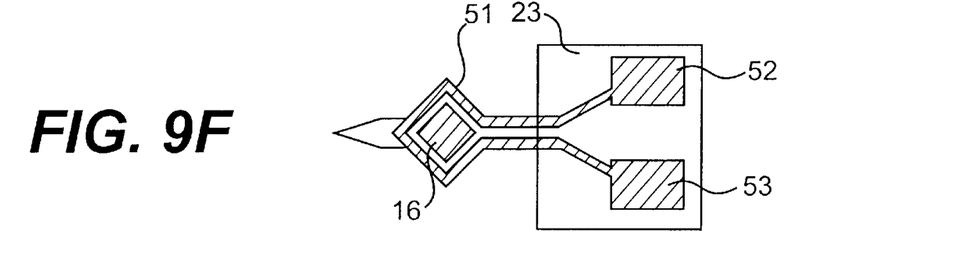

Next, silicon nitride films 23, 24, 12, and 13 are patterned using a resist or the like, and the exposed portions of the substrate 11 are removed by isotropic etching using the silicon nitride films 23 as masks (FIGS. 9D and 9E). In this way, a probe needle which has wiring 51 and pads 52 and 53 made of gold, for example, as shown in FIG. 8 can be obtained (FIGS. 9E and 9F).

Figure 10:
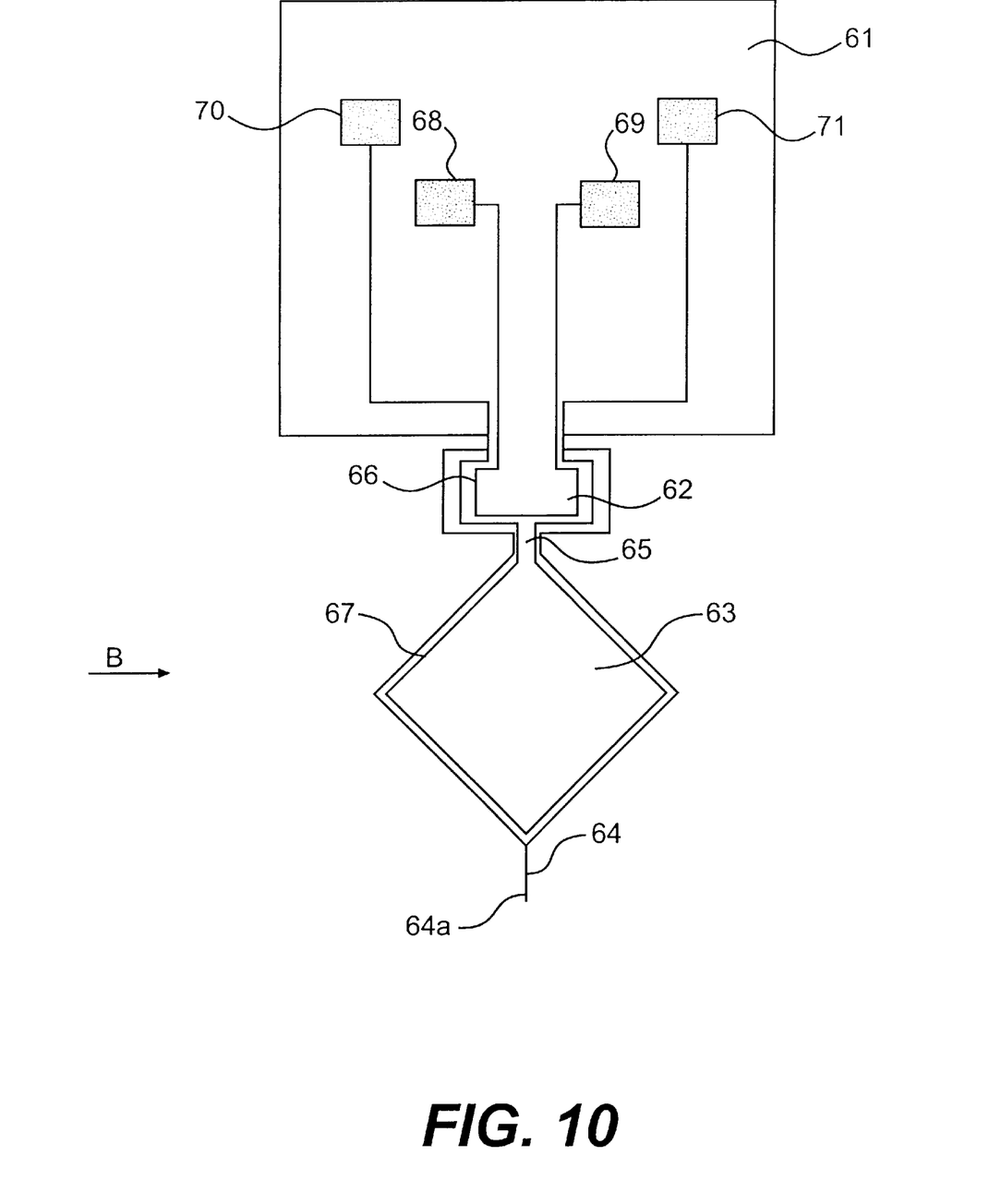
FIG. 10 illustrates the structure of a probe needle in accordance with the second preferred embodiment of the present invention.

FIG. 10 is a schematic front view of a wired probe needle arrangement for a probe microscope, according to a third preferred embodiment of the present invention. The probe microscope probe needle arrangement shown in FIG. 10 is constructed of a supporting body 61, a vibration-exciting part 62 which protrudes from the supporting body 61, a vibrating part 63, and a probe needle part 64, for example.

The supporting body 61, vibrating part 63, and probe needle part 64 roughly correspond to the supporting body 1, detection part 3, and the probe needle part 4 of the probe needle arrangement shown in FIG. 1, respectively. However, in the probe needle arrangement of the present embodiment, the vibration-exciting part 62 is disposed on the connecting part. The vibration-exciting part 62 and vibrating part 63 are flat plate-form parts. The vibration-exciting part 62 and vibrating part 63 are connected by a connecting torsional part 65 which has a small width. Since the connecting torsional part 65 has a small width, the torsional rigidity of the part 65 is smaller.

The vibration-exciting part 62, vibrating part 63, and the probe needle part 64 are formed along substantially the same axis and same plane. These parts may also be formed integrally with the supporting body 61. As in the case of the probe needle arrangement shown in FIG. 1A, the probe needle part 64 has, for example, a width of 100 to 200 nm and a length of approximately 3 microns. The tip end portion 64a of the probe needle part 64 preferably protrudes in a lateral or inclined direction. However, this tip end portion 64a may also be rectilinear. Furthermore, it is even more desirable if the tip end portion 64a of the probe needle part 64 is sharply pointed.

A driving coil 66 made of a metal, for example, is formed on the vibration-exciting part 62, and the end portions of the driving coil 66 are respectively connected to the pads 68 and 69 on the supporting body 61. A vibration-detecting coil 67 which is used to detect the excited state of the vibrating part 63 is formed on the vibrating part 63 instead of a light-reflecting surface. The end portions of the vibration-detecting coil 67 are respectively connected to pads 70 and 71.

The probe needle arrangement constructed as described above is placed in a magnetic field which is parallel to the direction of width of the vibrating part 63. Furthermore, an alternating current is caused to flow between the pads 68 and 69, so that a Lorentz force is generated in the torsional direction in the vibration-exciting part 62 on which the driving coil 66 is formed. Furthermore, the direction of the current flowing between the pads 68 and 69 is altered at a frequency which is equal to the torsional resonance frequency of the probe needle arrangement. In this way, the vibration-exciting part 62, vibrating part 63, and probe needle part 64 can be excited to the state of torsional resonance. Since the magnetic flux passing through the detection coil 67 of the vibrating part 63 also varies according to such torsional vibration of the probe needle, an induced current flows through the detection coil 67. Accordingly, by detecting the current between the pads 70 and 71, the amplitude and frequency of the torsional vibration of the vibrating part 63 can be detected. If an interaction occurs between the probe needle part 64 of the probe needle arrangement and the sample 5, the probe needle part 64 is pulled in the direction of the force, so that the probe needle part 64 and vibrating part 63 deviate from the rotational axis of the torsional vibration. Since the moment of inertia changes as a result, the state of torsional vibration of the vibrating part 63 can be detected as a change in the amplitude or resonance frequency. Changes in the amplitude or resonance frequency of the torsional vibration of the vibrating part 63 can be detected using the induced current that flows through the detection coil 67 of the vibrating part 63. Accordingly, the interaction force between the probe needle part 64 and the sample 5 can be determined by detecting the magnitude and/or frequency of the induced current flowing through the detection coil 67, so that the surface profile of the sample can be imaged. Furthermore, in the probe needle arrangement with a shape such as that shown in FIG. 10, the driving coil 66 of the vibration-exciting part 62 may also be split into two coils.

In the above examples, it is also possible to install a driving piezo-electric film on the probe needle arrangement instead of the driving coil. For example, such a piezo-electric film may be installed in a split manner on the vibration-exciting part 62 without interfering the detection wiring. Such a piezo-electric film can be formed on the surface of the silicon nitride, which forms the main body of the probe needle arrangement in the thin-film manufacturing process of the probe needle arrangement. A torsional vibration can be applied to the probe needle part 64 by applying an alternating current to the piezo-electric film. Thus, if there is no utilization of electromagnetic force, there is no need for an external magnetic field; accordingly, the arrangement can be simplified.

Furthermore, it is also possible to use a vibration-detecting piezo-electric thin film instead of the detection coil 67 in order to detect changes in the torsional vibration. In such a case, the sensitivity can be increased by installing this piezo-electric thin film on the connecting torsional part. In this vibration-detecting piezo-electric thin film, an electromotive force is generated by the strain caused by the torsional vibration. This electromotive force varies according to the amplitude and frequency of the torsional vibration. Accordingly, changes in the interactive force between the probe needle part 4 and the sample 5 can be determined by detecting the magnitude and/or frequency of the electromotive force generated at the piezo-electric thin film.

Furthermore, a vibration-detecting resistance, such as piezo-electric resistance element, for example, may also be used instead of a vibration-detecting piezo-electric thin film in order to detect changes in the torsional vibration.

As described above, the structure can be simplified by installing an excitation device on the probe needle arrangement. Furthermore, if light is not used for detection, the optical system and light path used for light detection become unnecessary, so that the device can be reduced in size and simplified.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for detecting an interaction force between a probe needle arrangement and a sample surface, the method comprising the steps of:

generating a torsional resonant vibration centered on an axis within the probe needle arrangement, the axis passing along the length of the probe needle arrangement and being substantially perpendicular to the sample surface; and detecting the interactive force from changes in the torsional resonant vibration.

2. The method as claimed in claim 1, wherein the generating step generates the torsional resonant vibration by a mechanical excitation of the probe needle arrangement.

3. The method as claimed in claim 1, wherein the generating step generates the torsional resonant vibration using an electromagnetic force.

4. The method as claimed in claim 1, wherein the detecting step detects the interactive force from changes in the amplitude of the torsional resonant vibration.

5. The method as claimed in claim 1, wherein the detecting step detects the interactive force from changes in the resonant frequency of the torsional resonant vibration.

6. The method as claimed in claim 1, wherein the detecting step involves optical detection.

7. The method as claimed in claim 1, wherein the detecting step involves electromagnetic detection.

8. A probe needle arrangement movement method in a probe microscope, the method comprising the steps of:

exciting a torsional resonant vibration in the probe needle arrangement;

moving the probe needle arrangement relative to a sample;

detecting changes in an interaction force between the probe needle arrangement and the sample by detecting changes in the torsional resonant vibration; and determining a further direction of movement of the probe needle arrangement in relation to a current placement of the probe needle arrangement and an amount of change in the interactive force when a change in the interactive force is detected.

9. The method as claimed in claim 8, wherein the exciting step excites the torsional resonant vibration by a mechanical excitation of the probe needle arrangement.

10. The method as claimed in claim 8, wherein the exciting step excites the torsional resonant vibration using an electromagnetic force.

11. The method as claimed in claim 8, wherein the detecting step detects the changes in the interactive force by detecting changes in the vibrational amplitude of the torsional resonant vibration.

12. The method as claimed in claim 8, wherein the detecting step detects the changes in the interactive force by detecting changes in the resonant frequency of the torsional resonant vibration.

13. A method of imaging the surface profile of a sample using a probe needle arrangement of a probe microscope, the method comprising the steps of:

generating a torsional resonant vibration in the probe needle arrangement;

moving the probe needle arrangement towards the sample;

detecting changes in an interaction force between the probe needle arrangement and the sample by detecting changes in the torsional resonant vibration;

determining a further direction of movement of the probe needle arrangement in relation to a current placement of the probe needle arrangement and an amount of change of the current interaction force each time a change in the interaction force is detected;

storing data corresponding to each of the new directions of movement determinations in a memory unit; and imaging the surface profile of the sample from the data corresponding to each of the further directions of movement determinations stored in the memory unit.

14. A method of imaging a surface profile of a sample using a probe of a probe microscope, the method comprising the steps of:

moving the probe towards the sample;

detecting changes in an interaction force between the probe and the sample;

determining a new direction of movement of the probe in relation to a current placement of the probe and an amount of change of the interaction force each time a change in the interaction force is detected;

storing data corresponding to each of the new directions of movement determinations in a memory unit; and imaging the surface profile of the sample from the data corresponding to each of the further directions of movement determinations stored in the memory unit.

15. A probe microscope having a probe for imaging a surface profile of a sample, comprising:

a movement device for driving the probe relative to a sample surface to be measured;

a displacement detector for detecting changes in an interaction force between the probe and the sample;

a determining section for determining a new direction of movement of the probe in relation to a current placement of the probe and an amount of change of the interaction force each time a change in the interaction force is detected;

a memory for storing data corresponding to each of the new direction of movement determinations in a memory unit; and an imaging section for imaging the surface profile of the sample from the data corresponding to each of the new direction of movement determinations stored in the memory unit.

16. The probe microscope of claim 15, wherein the probe is a pointed non-contact probe.

* * * * *